United States Patent
Dayan et al.

(10) Patent No.: US 7,366,888 B2
(45) Date of Patent: Apr. 29, 2008

(54) BOOTING TO A RECOVERY/MAINTENANCE ENVIRONMENT

(75) Inventors: Richard Alan Dayan, Wake Forest, NC (US); Joseph Wayne Freeman, Raleigh, NC (US); William Fred Keown, Jr., Raleigh, NC (US); Randall Scott Springfield, Chapel Hill, NC (US)

(73) Assignee: Lenovo Singapore Pte. Ltd, Singapore (SG)

( * ) Notice: Subject to any disclaimer, the term of this patent is extended or adjusted under 35 U.S.C. 154(b) by 1328 days.

(21) Appl. No.: 09/876,426

(22) Filed: Jun. 7, 2001

(65) Prior Publication Data

US 2002/0188837 A1 Dec. 12, 2002

(51) Int. Cl.
*G06F 15/177* (2006.01)
(52) U.S. Cl. .......................................................... 713/2
(58) Field of Classification Search ................. 713/2
See application file for complete search history.

(56) References Cited

U.S. PATENT DOCUMENTS 5,956,475 A * 9/1999 Burckhartt et al. ........... 714/23
6,282,642 B1 * 8/2001 Cromer et al. ................. 713/2
6,385,721 B1 * 5/2002 Puckette ......................... 713/2
6,490,722 B1 * 12/2002 Barton et al. ............... 717/174
6,640,316 B1 * 10/2003 Martin et al. ................ 714/36
6,807,643 B2 * 10/2004 Eckardt et al. .............. 714/36

* cited by examiner

*Primary Examiner*—Rehana Perveen
*Assistant Examiner*—Eric Chang
(74) *Attorney, Agent, or Firm*—Winstead Sechrest & Min

(57) ABSTRACT

A system, computer program product and method for booting to a partition in a non-volatile storage unit without a local operator. In one embodiment, one or more bits in a BOOT register may be set by an operating system indicating if the BIOS should boot to the partition. The BIOS may then read the BOOT register to determine if the BIOS is to boot to the partition as well as any activities to perform if the BIOS is to boot to the partition. In another embodiment, a network interface card may insert directive information received from a packet in a register within the network interface card. The BIOS may then read the register within the network interface card to determine if the BIOS is to boot to the partition as well as any activities to perform if the BIOS is to boot to the partition.

21 Claims, 4 Drawing Sheets

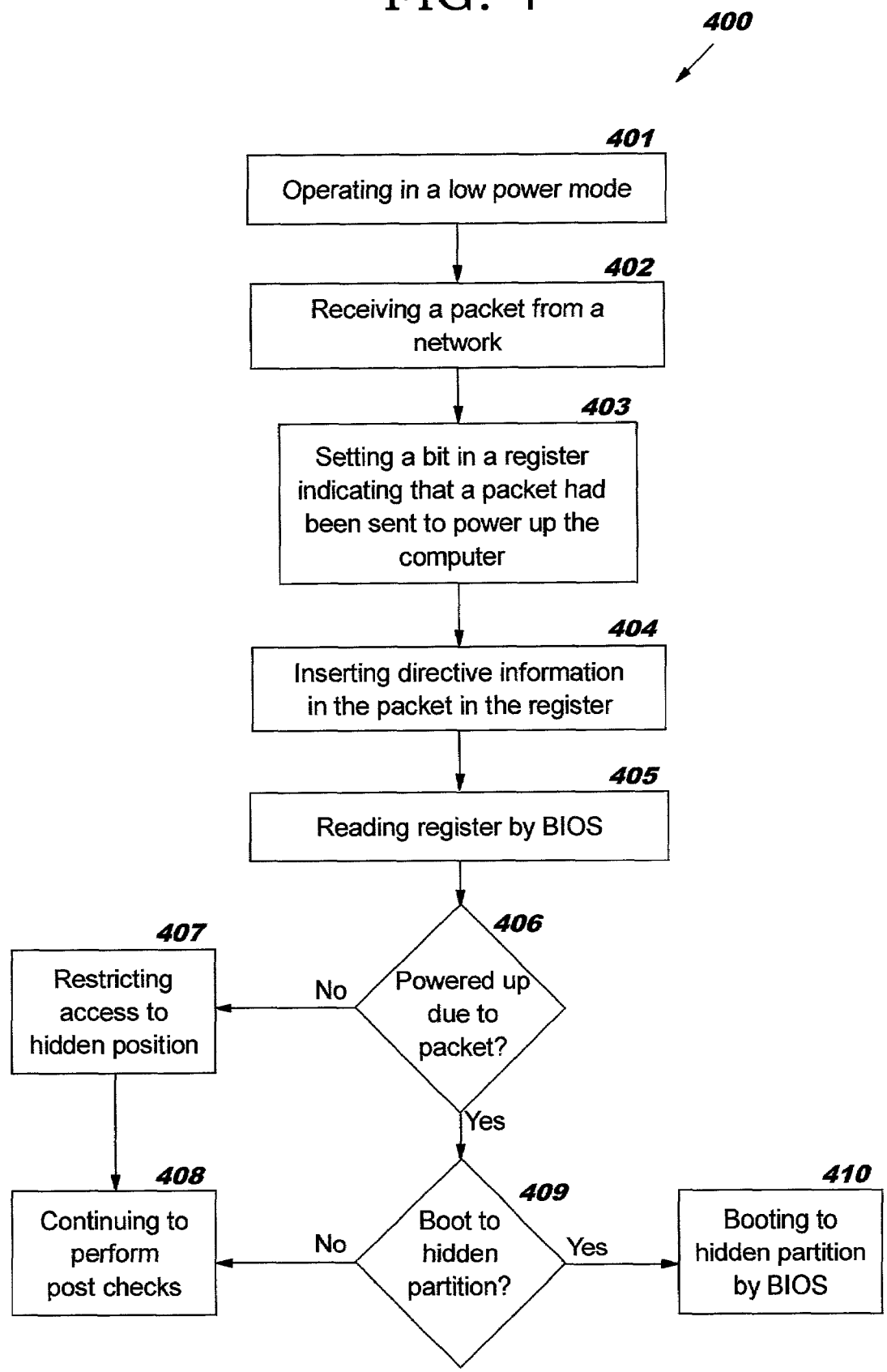

BOOTING TO A RECOVERY/MAINTENANCE ENVIRONMENT

TECHNICAL FIELD

The present invention relates to the field of booting computers, and more particularly to booting to a designated partition in a non-volatile storage unit storing code to conduct recovery/maintenance operations without requiring a local operator.

BACKGROUND INFORMATION

In computers generally, the main memory, e.g., Random Access Memory (RAM), of a computer stores an operating system program during operation of the computer. Typically, the main memory is a volatile memory where the programs and data stored in the main memory are lost when the power to computer is cut off for whatever reason.

A computer may further comprise non-volatile storage devices, e.g., Read Only Memory (ROM), hard disk drive, floppy disk drives, configured to store an operating system program. There are two situations that require the transfer of the operating system program from a non-volatile storage device, e.g., hard disk drive, to a volatile storage device, e.g., RAM. One situation is when the computer is initially turned on. The second situation is when a malfunction in computer hardware or software causes the computer to become unresponsive to commands of a user. In both situations, the process of accessing the non-volatile storage device, e.g., hard disk drive, is commonly referred to as "booting."

When the computer is initially turned on, a Basic Input Output System (BIOS) stored in a non-volatile storage device, e.g., ROM, is activated to invoke a series of system checks commonly referred to as power-on self-tests (POST). The POST checks the integrity of basic hardware components such as the main memory, the keyboard, any disk drives and other storage devices. The hardware configuration is checked to determine whether it matches the hardware specification entered by the user. The hardware configuration includes the type of keyboard, the number and types of data storage devices, and the amount of main memory available. If the hardware is determined to be functioning properly and the hardware configuration matches the specification entered by the user, the operating system is loaded from a non-volatile data storage device, e.g., hard disk drive, into the main memory.

Computers may further comprise a partition in a non-volatile data storage device, e.g., hard disk drive. The partition may store an original copy of the operating system files and the code to restore them in case of accidental corruption of the operating system program in the main memory.

The BIOS may "boot" to the partition to load the original copy of the operating system program into the main memory when the operating system program becomes damaged. When the operating system program becomes damaged, the computer will not operate properly until the BIOS boots to the partition to load the original copy of the operating system program into the main memory. Unfortunately, a local operator is required to boot to the hidden partition such as by manually pressing a key.

It would therefore be desirable to boot to a designated partition in a nonvolatile storage unit without requiring a local operator. It would further be desirable to boot to a designated partition in a non-volatile storage unit to conduct recovery/maintenance operations without requiring a local operator.

SUMMARY

The problems outlined above may at least in part be solved in some embodiments by setting one or more bits in a BOOT register or inserting directive information from a magic packet in a register in a network interface card to indicate to the BIOS to boot to a designated partition in a non-volatile storage unit to conduct recovery/maintenance operations without requiring a local operator. The designated partition may be invisible to the operating system and resistant to modification by any programs running under the operating system. The designated partition may store an original copy of the operating system files and the code to restore them in case of accidental corruption of the operating system program loaded in the main memory. The designated partition may further store code to invoke diagnostic routines to inspect suspected hardware failures. Furthermore, the designated partition may be used to store code that enables remote diagnosis in the case of a system crash. The designated partition may further be used to store system code update routines, e.g., BIOS flash update In one embodiment of the present invention, a method for booting to a partition without a local operator using a BOOT register may comprise the step of an operating system determining that one or more programs within the partition in a nonvolatile storage unit may need to be accessed to resolve a problem, e.g., corrupt driver, hardware failure, operating system program in main memory became damaged. Once the operating system determines that the partition needs to be accessed, the operating system may search a table such as a Root System Description Table (RSDT) for a pointer to the location of the BOOT register. The BOOT register may comprise a plurality of bits where one or more bits may be used to communicate to the BIOS as to what actions need to be taken on the next boot. The operating system may set one or more bits in the BOOT register to indicate to the BIOS as to whether or not to boot to the partition to conduct recovery/maintenance operations on the subsequent boot. The one or more bits set by the operating system may indicate to the BIOS to perform one or more activities, e.g., loading the original copy of the operating system, executing code to run a diagnosis, enabling remote problem determination and correction, updating routines, on the subsequent boot to the partition. Operating system may then issue a request to the BIOS to shut down or restart the processing unit which allows the BIOS to invoke a series of system checks commonly referred to as Power-On Self-Tests (POST). During the POST, the BIOS may then read the BOOT register and determine whether or not to boot to the partition as well as any activities to perform if the BIOS is to boot to the partition.

In another embodiment of the present invention, a method for booting to a partition without a local operator using a magic packet may comprise the step of a network interface card in a processing unit operating in a lower power mode receiving a magic packet from a network, e.g., Local Area Network (LAN). A magic packet may include the destination address of the network interface card repeated a certain number of times, e.g., sixteen times, to indicate to the network interface card to power up the processing unit. The magic packet may further comprise directive information indicating if the BIOS should boot to the partition. The network interface card upon receiving the magic packet may set a bit in a register within the network interface card indicating that a magic packet has been sent to power up the processing unit. Furthermore, the network interface card may insert the directive information within the magic packet in the register within the network interface card which is accessible to the BIOS. Upon the processing unit powering, the BIOS may read the register within the network interface card. If the BIOS determines from reading the register that the processing unit was powered up due to a magic packet then the BIOS may determine from reading the register if the BIOS is to boot to the partition as well as any activities to perform if the BIOS is to boot to the partition.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 4 is a flowchart of a method for booting to a designated partition in a non-volatile storage unit to conduct recovery/maintenance operations without requiring a local operator using a magic packet.

DETAILED DESCRIPTION

The present invention comprises a system, computer program product and method for booting to a designated partition in a non-volatile storage unit to conduct recovery/ maintenance operations without requiring a local operator. In one embodiment, one or more bits in a BOOT register may be set by an operating system indicating to the BIOS if the BIOS should boot to the partition as well as any activities to perform if the BIOS is to boot to the partition. Operating system may then issue a request to the BIOS to shut down or restart the processing unit which allows the BIOS to invoke a series of system checks commonly referred to as Power-On Self-Tests (POST). During the POST, the BIOS may then read the BOOT register and determine if the BIOS is to boot to the partition as well as any activities to perform if the BIOS is to boot to the partition. In another embodiment, a packet may be received by a network interface card in a processing unit operating in a low power mode from a network. The packet may include the destination address of the network interface card repeated a certain number of times, e.g., sixteen times, to indicate to the network interface card to power up the processing unit. The packet may further comprise directive information for determining if the BIOS should boot to the partition. The network interface card may insert the directive information in a register within the network interface card which is accessible to the BIOS. Upon the processing unit powering, the BIOS may read the register within the network interface card to determine if the BIOS is to boot to the partition as well as any activities to perform if the BIOS is to boot to the partition.

Figure 1:
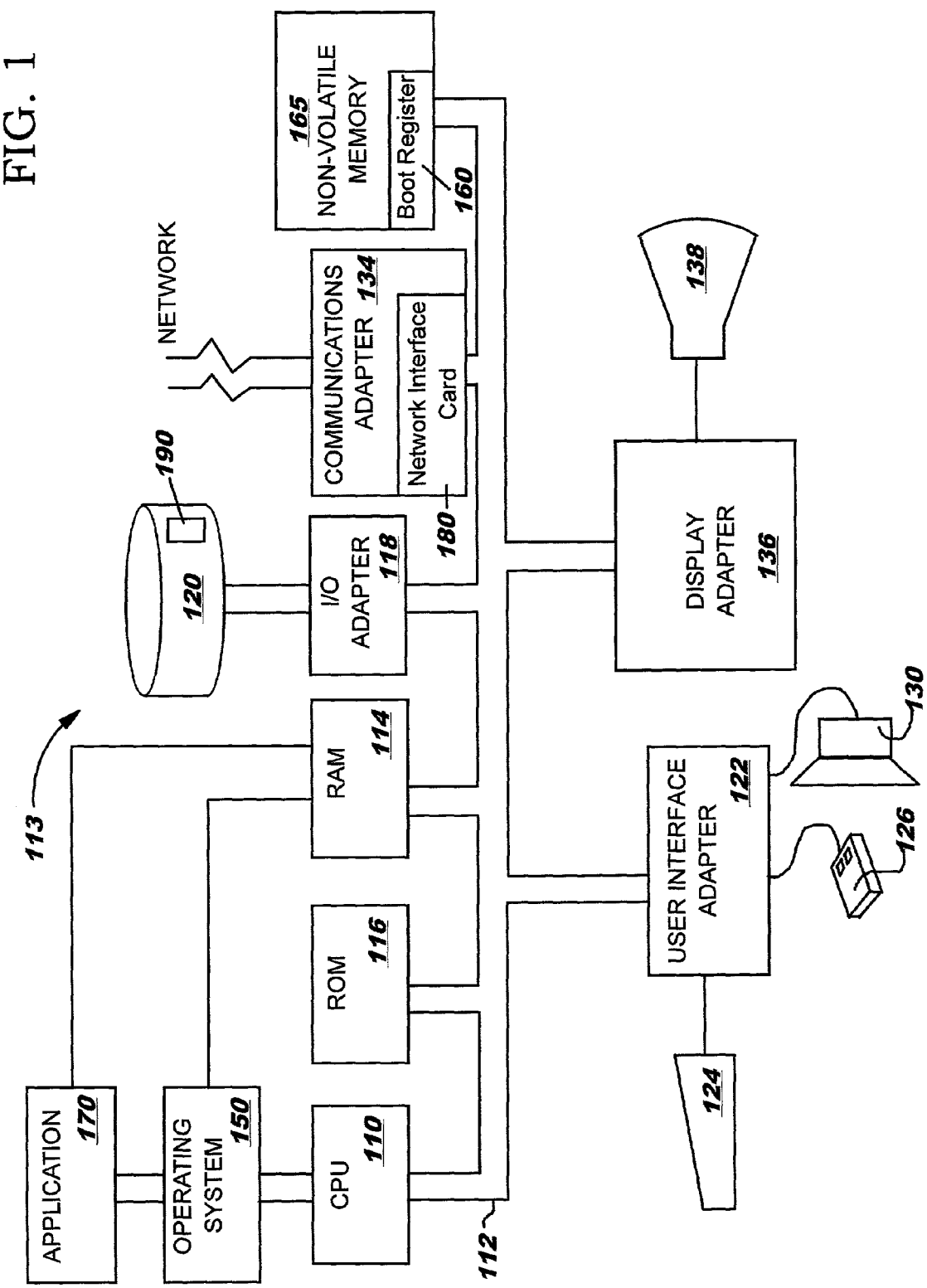
FIG. 1 illustrates an embodiment of a data processing unit configured in accordance with the present invention.

FIG. 1—Computer System

FIG. 1 illustrates a typical hardware configuration of data processing system 113 which is representative of a hardware environment for practicing the present invention. Data processing system 113 has a central processing unit (CPU) 110 coupled to various other components by system bus 112. An operating system 150 runs on CPU 110 and provides control and coordinates the function of the various components of FIG. 1. An application 170 runs in conjunction with operating system 150 and provides output calls to operating system 150 which implements the various functions or services to be performed by application 170. Read only memory (ROM) 116 is coupled to system bus 112 and includes a basic input/output system ("BIOS") that controls certain basic functions of data processing system 113. Non-volatile memory 165 is coupled to system bus 112 and may comprise a BOOT register 160 thereby providing a mechanism for operating system 150 to communicate to the BIOS about what actions need to taken on the next boot. A more detailed description of operating system 150 writing to BOOT register 160 and the BIOS reading BOOT register 160 during POST to determine what actions to take on a subsequent boot is provided in the description of FIG. 2. Random access memory (RAM) 114, I/O adapter 118, and communications adapter 134 are also coupled to system bus 112. It should be noted that software components including operating system 150 and application 170 are loaded into RAM 114 which is the computer system's main memory. I/O adapter 118 may be an integrated drive electronics ("IDE") adapter that communicates with disk unit 120, e.g., disk drive. Disk unit 120 may comprise a "hidden" partition 190 invisible to operating system 150 and resistant to modification by any programs running under operating system 150 including operating system 150 itself. The hidden partition 190 may store an original copy of the operating system files and the code to restore them in case of accidental corruption of the operating system program loaded in main memory 114. The hidden partition 190 may further store code to invoke diagnostic routines to inspect suspected hardware failures. Furthermore, the hidden partition 190 may be used to store code that enables remote diagnosis in the case of a system crash. The hidden partition 190 may further be used to store system code update routines, e.g., BIOS flash update. It is noted that the "hidden" partition 190 may reside in any non-volatile storage device and that FIG. 1 is illustrative. It is further noted that the program of the present invention that allows the BIOS to boot to a designated partition in a non-volatile storage unit, e.g., disk unit 120, to conduct recovery/maintenance operations without requiring a local operator using BOOT register 160, as described in FIG. 2, may reside in disk unit 120 or in application 170.

Communications adapter 134 interconnects bus 112 with an outside network enabling data processing system 113 to communicate with other such systems via a Local Area Network (LAN), e.g., Ethernet, Token Ring, ARCnet, or a Wide Area Network (WAN), e.g., Internet. Communications adapter 134 may comprise a network interface card 180 that may be used to remotely boot hidden partition 190 in a non-volatile storage unit, e.g., disk unit 120, in connection with an embodiment implementing a "magic packet" is described in greater detail in the description of FIG. 3. It is noted that the program of the present invention that allows the BIOS to boot to a designated partition in a non-volatile storage unit, e.g., disk unit 120, to conduct recovery/maintenance operations without requiring a local operator "using a magic packet", as described in FIG. 4, may reside in disk unit 120 or in application 170.

Input/Output devices are also connected to system bus 112 via a user interface adapter 122 and display adapter 136. Keyboard 124, mouse 126 and speaker 130 are all interconnected to bus 112 through user interface adapter 122. Event data may be input to data processing system 113 through any of these devices. A display monitor 138 is connected to system bus 112 by display adapter 136. In this manner, a user is capable of inputting to data processing system 113 through keyboard 124 or mouse 126 and receiving output from data processing system 113 via display 138 or speaker 130.

Implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change.

Figure 2:
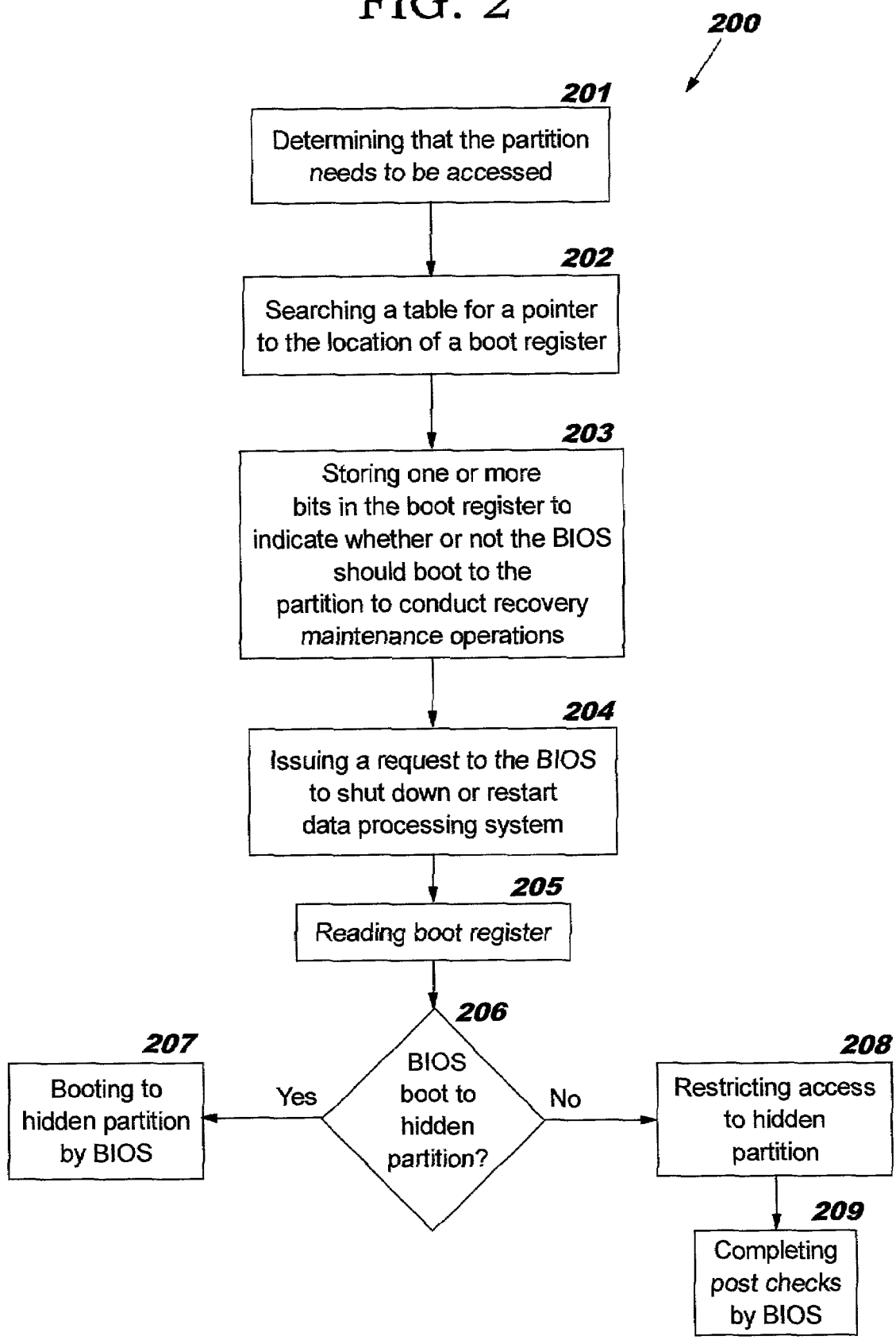
FIG. 2 is a flowchart of a method for booting to a designated partition in a non-volatile storage unit to conduct recovery/maintenance operations without requiring a local operator using a BOOT register.

FIG. 2—Flowchart of a Method for Booting to a Designated Partition Without Requiring a Local Operator Using a BOOT Register FIG. 2 is a flowchart of one embodiment of the present invention of a method 200 for booting to a designated partition in a non-volatile storage unit, e.g., disk unit 120, to conduct recovery/maintenance operations without requiring a local operator. As stated in the Background Information section, the BIOS may "boot" to a partition in a non-volatile storage unit, e.g., disk unit 120, to load the original copy of the operating system program into main memory 114 when the operating system program becomes damaged. Unfortunately, a local operator is required to boot to the partition such as by manually pressing a key. It would therefore be desirable to boot to a designated partition in a non-volatile storage unit, e.g., disk unit 120, without requiring a local operator. It would further be desirable to boot to a designated partition in a non-volatile storage unit, e.g., disk unit 120, to conduct recovery/maintenance operations without requiring a local operator. Method 200 is a method for booting to a designated partition in a non-volatile storage unit, e.g., disk unit 120, to conduct recovery/maintenance operations without requiring a local operator.

In step 201, operating system 150 may determine that one or more programs within hidden partition 190 in a non-volatile storage unit, e.g., disk unit 120, need to be accessed to resolve a problem, e.g., corrupt driver, hardware failure, operating system program in main memory 114 became damaged.

In step 202, once operating system 150 determines that hidden partition 190 in a non-volatile storage unit, e.g., disk unit 120, needs to be accessed, operating system 150 may search a table, e.g., Root System Description Table (RSDT) table, built by the BIOS at boot, for a pointer to the location of BOOT register 160. In one embodiment, the table, e.g., RSDT table, may reside in system memory 114. As stated above, BOOT register 160 may allow operating system 150 to communicate to the BIOS about what actions need to be taken on the next boot. BOOT register 160 may comprise a plurality of bits, e.g., eight bits, where one or more bits may be used to communicate to the BIOS as to what actions need to be taken on the next boot. For example, a particular bit may indicate if the previous boot was completed. A particular bit may indicate whether to run diagnostics. A parity bit may be used to verify the integrity of BOOT register 160.

In step 203, operating system 150 may set one or more bits in BOOT register 160 to indicate to the BIOS if the BIOS is to boot to hidden partition 190 in a nonvolatile storage unit, e.g., disk unit 120, to conduct recovery/maintenance operations on the subsequent boot. In one embodiment, if operating system 150 determines that hidden partition 190 needs to be accessed by the BIOS, then operating system 150 may set one or more bits in BOOT register 160 to indicate to the BIOS to boot to hidden partition 190 to perform one or more of the following activities: loading the original copy of the operating system, executing code to run a diagnosis, enabling remote problem determination and correction, updating routines. It is noted that the BIOS may perform other activities than those previously listed and that the list is illustrative.

In step 204, operating system 160 may issue a request to the BIOS to shut down computer 113 or restart computer 113. Upon the BIOS shutting down or restarting computer 113, the BIOS invokes a series of system checks commonly referred to as Power-On Self-Tests (POST). In step 205, the BIOS reads BOOT register 160 during the POST checks to determine what actions to take.

In step 206, a determination may be made as to whether one or more of the plurality of bits in BOOT register 160 indicates that the BIOS should boot to hidden partition 190 to conduct recovery/maintenance operations including performing such activities such as: loading the original copy of the operating system, executing code to run a diagnosis, enabling remote problem determination and correction, updating routines, on the subsequent boot. If BOOT register 160 indicates that the BIOS should boot to hidden partition 190 to conduct recovery/maintenance operations, then the BIOS boots to hidden partition 190 in a non-volatile storage unit, e.g., disk unit 120, to conduct recovery/maintenance operations without requiring a local operator in step 207. As stated above, BOOT register 160 may indicate that the BIOS should boot to hidden partition 190 to conduct recovery/maintenance operations if certain bit(s) are set in BOOT register 160. If BOOT register 160 does not indicate that the BIOS should boot to hidden partition 190 to conduct recovery/maintenance operations, then access to hidden partition 190 is restricted in step 208. That is, hidden partition 190 becomes resistant to modification by any programs running under operating system 150. In step 209, the BIOS completes the POST checks.

It is noted that method 200 may be executed in a different order presented and that the order presented in the discussion of FIG. 2 is illustrative. It is further noted that certain steps may be executed almost concurrently.

Figure 3:
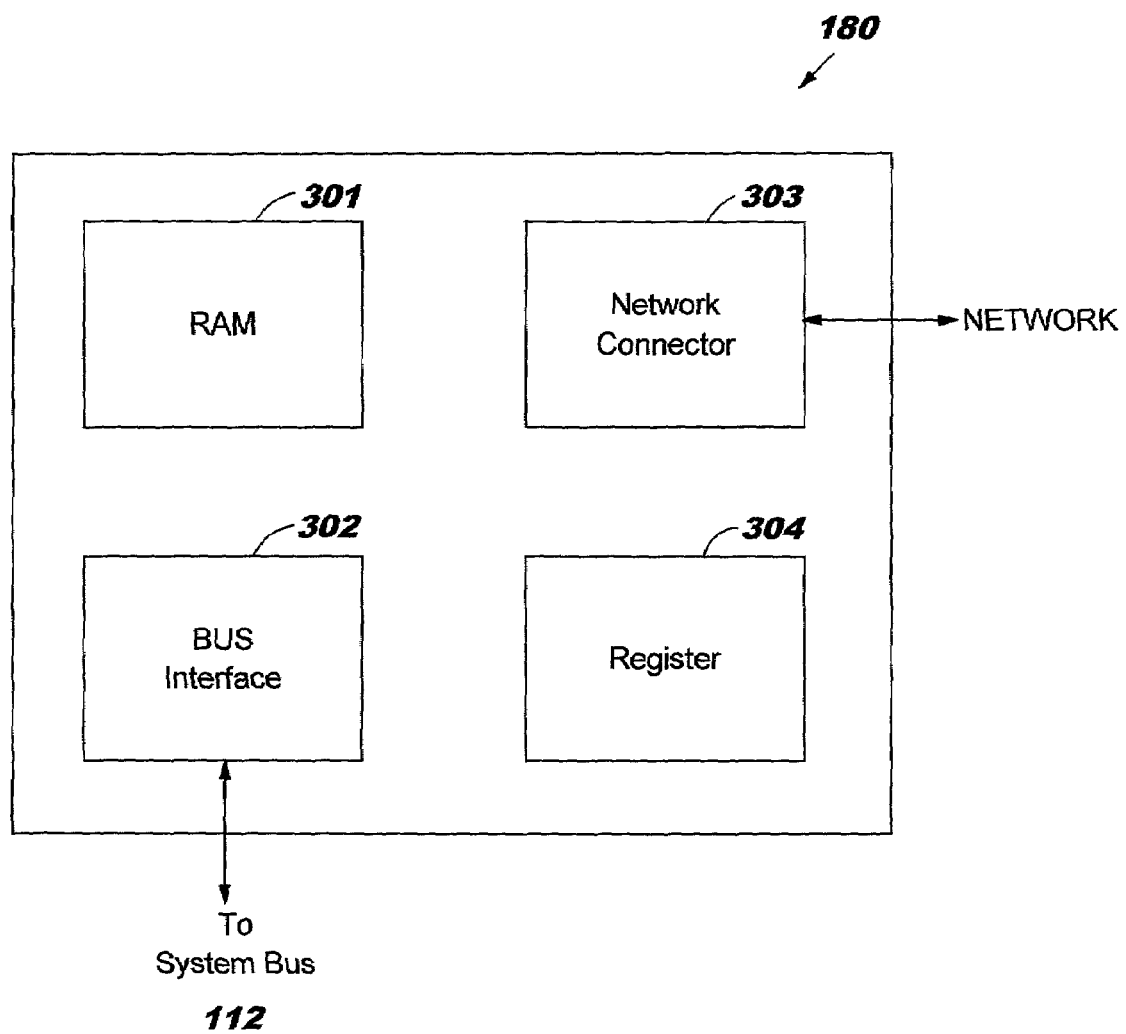
FIG. 3 illustrates an embodiment of a network interface card configured in accordance with the present invention.

FIG. 3—Network Interface Card

FIG. 3 illustrates an embodiment of the present invention of network interface card 180. Referring to FIG. 3, network interface card 180 may comprise a bus interface 302 for connecting to system bus 112 and one or more network connectors 303 for connecting to one or more networks, e.g., LAN, WAN. The one or more network connectors 303 may comprise, for example, a conventional BNC connector assembly or an AUI connector assembly for connecting to an Ethernet or ARCnet network, or an RJ-45 connector assembly for connecting to an Ethernet or Token Ring network.

Network interface card 180 may further comprise a Random Access Memory (RAM) 301. RAM 301 may be used to store the destination address of network interface card 180. Furthermore, RAM 301 may further store a list of packets that network interface card 180 should monitor while computer 113 operates in "power down" state, i.e., operates in low power mode, as will be discussed in greater detail below. Network interface card 180 may further comprise a register 304 where one or more bits in register 304 indicate that the BIOS should boot to hidden partition 190 to conduct recovery/maintenance operations as described in greater detail below.

As stated above, network interface card 180 may be used to remotely boot to hidden partition 190 in a non-volatile storage unit, e.g., disk unit 120, in connection with an embodiment implementing a "magic packet." A magic packet may be defined to be a remote frame sent to a computer 113 in a network, e.g., LAN, that includes the destination address, e.g., address of computer 113, repeated a certain number of times, e.g., sixteen times, within the packet. When computer 113 is in a "power down" state, i.e., computer 113 operates in low power mode, network interface card 180 of computer 113 monitors all incoming message packets for one that has its destination address repeated a certain number of times, e.g., sixteen times. When network interface card 180 detects an incoming packet with this address sequence, network interface card 180 may set a bit in register 304 indicating that a packet, i.e., a magic packet, had been sent to computer 113 repeating its destination address a certain number of times, e.g., sixteen times, to power up computer 113. In another embodiment, network interface card 180 may activate a power switch in computer 113 to power up computer 113. In another embodiment, network interface card 180 may generate a power management wake up signal (PME) to initiate a wake up routine in computer 113.

In one embodiment, the magic packet, i.e., a remote frame sent to computer 1113 in a network, may comprise an order to set register 304 to indicate to the BIOS to boot to hidden partition 190 in a non-volatile storage unit, e.g., disk unit 120. For example, the magic packet may comprise one or more bits following the destination address repeated a certain number of times, e.g., sixteen times, that indicates if the BIOS should boot to hidden partition 190 in a non-volatile storage unit, e.g., disk unit 120. If the magic packet indicates that the BIOS should boot to hidden partition 190, then network interface card 180 may set one or more bits in register 304 to indicate that the BIOS should boot to hidden partition 190 in a non-volatile storage unit, e.g., disk unit 120. In one embodiment, network interface card 180 may set one or more bits in register 304 to indicate to the BIOS to boot to hidden partition 190 to perform various activities such as: loading the original copy of the operating system, executing code to run a diagnosis, enabling remote problem determination and correction, updating routines, etc. It is noted that the BIOS may perform other activities than those previously listed and that the list is illustrative. By incorporating an order for the BIOS to boot to hidden partition 190, a remote operator, e.g., system administrator, may be able to remotely conduct recovery/maintenance operations on computer 113, e.g., run diagnostics, update flash BIOS. A method of remotely conducting recovery/maintenance operations on computer 113 implementing a magic packet is described below.

FIG. 4—Flowchart of a Method for Booting to a Designated Partition Without Requiring a Local Operator Using a Magic Packet FIG. 4 is a flowchart of one embodiment of the present invention of a method 400 for booting to a designated partition in a non-volatile storage unit, e.g., disk unit 120, to conduct recovery/maintenance operations without requiring a local operator using a magic packet.

Referring to FIG. 4, in step 401, computer 113 operates in a "power down" state, i.e., operates in low power mode. It is noted that computer 113 may operate in a "power down" state for a variety of reasons such as inactivity. It is further noted that computer 113 may operate in a "power down" state for other reasons that would be recognized by an artisan of ordinary skill in the art and that such embodiments employing such reasons would fall within the scope of the present invention.

In step 402, computer 113 receives a magic packet from the network, e.g., LAN, WAN, that includes the destination address of network interface card 180 repeated a certain number of times, e.g., sixteen times, along with a directive indicating if the BIOS should boot to hidden partition 190 in the non-volatile storage unit, e.g., disk unit 120. In one embodiment, the directive for determining if the BIOS should boot to hidden partition 190 may be included in the one or more bits following the repeated destination address. It is noted that the destination address may be repeated any number of times and that the directive may be inserted anywhere in the frame sent to computer 113.

In step 403, network interface card 180 may set a bit in register 304 indicating that a packet, i.e., a magic packet, had been sent to computer 113 repeating its destination address a certain number of times, e.g., sixteen times, to power up computer 113. In another embodiment, network interface card 180 may set a power switch in computer 113 to power up computer 113. In another embodiment, network interface card 180 may generate a power management wake up signal (PME) to initiate a wake up routine on computer 113. In step 404, network interface card 180 inserts the directive information received in the magic packet sent to computer 113 into register 304 which is accessible to the BIOS.

In step 405, upon computer 113 powering up, the BIOS may read register 304. In step 406, a determination may be made as to whether or not computer 113 was powered up due to a packet, i.e., a magic packet, sent to computer 113 that repeats its destination address a certain number of times, e.g., sixteen times. In one embodiment, the BIOS may determine whether a magic packet has been sent to computer 113 by reading register 304 in step 405. As stated above, a bit may be set in register 304 indicating that computer 113 received a magic packet to power up computer 113. If a magic packet had not been sent, i.e., the computer 113 was not powered up from the network, e.g., LAN, WAN, then access to hidden partition 190 is restricted in step 407. That is, hidden partition 190 becomes resistant to modification by any programs running under operating system 150. In step 408, the BIOS continues to perform POST checks.

If a magic packet has been sent, i.e., the computer 113 is powered up from the network, e.g., LAN, WAN, then a determination may be made if the BIOS should boot to hidden partition 190 in step 409. In one embodiment, BIOS reads register 304 in step 405 to determine if the BIOS should boot to hidden partition 190. As stated above, one or more bits in register 304 may indicate if the BIOS should boot to hidden partition 190 to conduct recovery/maintenance operations. If register 304 indicates that the BIOS should boot to hidden partition 190 to conduct recovery/maintenance operations, then the BIOS boots to hidden partition 190 in a non-volatile storage unit, e.g., disk unit 120, to conduct recovery/maintenance operations without requiring a local operator in step 410. As stated above, in one embodiment, one or more bits in register 304 may indicate to the BIOS to boot to hidden partition 190 to perform various activities such as: loading the original copy of the operating system, executing code to run a diagnosis, enabling remote problem determination and correction, updating routines, etc. If register 134 does not indicate that the BIOS should boot to hidden partition 190 to conduct recovery/maintenance operations, then access to hidden partition 190 is restricted in step 407. That is, hidden partition 190 becomes resistant to modification by any programs running under operating system 150. In step 408, the BIOS continues to perform POST checks.

It is noted that method 400 may be executed in a different order presented and that the order presented in the discussion of FIG. 4 is illustrative. It is further noted that certain steps, e.g., steps 403 and 404, may be executed almost concurrently.

Although the system, computer program product and method are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

The invention claimed is:

1. A method for booting to a partition without a local operator comprising the steps of:
   determining said partition needs to be accessed;
   searching a table for a pointer to a location of a register, wherein said register comprises a plurality of bits for communicating to a BIOS as to what actions need to be taken on a subsequent boot;
   setting one or more of said plurality of bits in said register to indicate if said BIOS should boot to said partition on said subsequent boot if said partition needs to be accessed by said BIOS;
   reading said register by said BIOS; and
   booting to said partition by said BIOS if said one or more of said plurality of bits in said register indicates that said BIOS should boot to said partition.

2. The method as recited in claim 1, wherein an operating system searches said table for said pointer to said location of said register, wherein said operating system sets said one or more of said plurality of bits in said register to indicate if said BIOS should boot to said partition on said subsequent boot.

3. The method as recited in claim 1 further comprising the step of:
   issuing a request to said BIOS to perform one of a shut down and a restart of a processing unit upon setting said one or more of said plurality of bits in said register to indicate if said BIOS should boot to said partition on said subsequent boot.

4. The method as recited in claim 3, wherein said BIOS invokes a series of system checks upon either of said shut down and said restart of said processing unit.

5. The method as recited in claim 4, wherein if said BIOS does not need to boot to said partition then the method further comprises the step of:
   restricting access to said partition; and
   completing said series of system checks.

6. The method as recited in claim 1, wherein said partition comprises one or more of the following: an original copy of files of an operating system, code to invoke one or more diagnostic routines, code to update routines, and code to enable remote problem determination and correction.

7. The method as recited in claim 1, wherein said one or more of said plurality of bits indicates that said BIOS should perform one or more of the following activities on said boot to said partition: loading an original copy of files of an operating system, invoking one or more diagnostic routines, updating routines, and enabling remote problem determination and correction.

8. A computer program product having computer readable medium having computer program logic recorded thereon for booting to a partition without a local operator, comprising:
   programming operable for determining said partition needs to be accessed;
   programming operable for searching a table for a pointer to a location of a register, wherein said register comprises a plurality of bits for communicating to a BIOS as to what actions need to be taken on a subsequent boot;
   programming operable for setting one or more of said plurality of bits in said register to indicate if said BIOS should boot to said partition on said subsequent boot if said partition needs to be accessed by said BIOS;
   programming operable for reading said register by said BIOS; and
   programming operable for booting to said partition by said BIOS if said one or more of said plurality of bits in said register indicates that said BIOS should boot to said partition.

9. The computer program product as recited in claim 8, wherein an operating system searches said table for said pointer to said location of said register, wherein said operating system sets said one or more of said plurality of bits in said register to indicate if said BIOS should boot to said partition on said subsequent boot.

10. The computer program product as recited in claim 8 further comprises:
    programming operable for issuing a request to said BIOS to perform one of a shut down and a restart of a processing unit upon setting said one or more of said plurality of bits in said register to indicate if said BIOS should boot to said partition on said subsequent boot.

11. The computer program product as recited in claim 10, wherein said BIOS invokes a series of system checks upon either of said shut down and said restart of said processing unit.

12. The computer program product as recited in claim 11, wherein if said BIOS does not need to boot to said partition then the computer program product further comprises:
    programming operable for restricting access to said partition; and
    programming operable for completing said series of system checks.

13. The computer program product as recited in claim 8, wherein said partition comprises one or more of the following: an original copy of files of an operating system, code to invoke one or more diagnostic routines, code to update routines, and code to enable remote problem determination and correction.

14. The computer program product as recited in claim 8, wherein said one or more of said plurality of bits indicates that said BIOS should perform one or more of the following activities on said boot to said partition: loading an original copy of files of an operating system, invoking one or more diagnostic routines, updating routines, and enabling remote problem determination and correction.

15. A system comprising:
a processor;
a first memory unit, wherein said first memory unit stores a BIOS;
a storage unit, wherein said storage unit comprises a partition;
a second memory unit operable for storing a computer program operable for booting to said partition without a local operator;
an input mechanism;
an output mechanism; and
a bus system coupling the processor to the first memory, storage unit, second memory unit, input mechanism, and output mechanism, wherein the computer program is operable for performing the following programming steps:
determining said partition needs to be accessed;
searching a table for a pointer to a location of a register, wherein said register comprises a plurality of bits for communicating to a BIOS as to what actions need to be taken on a subsequent boot;
setting one or more of said plurality of bits in said register to indicate if said BIOS should boot to said partition on said subsequent boot if said partition needs to be accessed by said BIOS;
reading said register by said BIOS; and
booting to said partition by said BIOS if said one or more of said plurality of bits in said register indicates that said BIOS should boot to said partition.

16. The system as recited in claim 15 further comprises:
an operating system loaded into said third memory unit, wherein said operating system is operable for searching said table for said pointer to said location of said register, wherein said operating system is operable for setting said one or more of said plurality of bits in said register to indicate if said BIOS should boot to said partition on said subsequent boot.

17. The system as recited in claim 15, wherein the computer program is further operable to perform the programming step:
issuing a request to said BIOS to perform one of a shut down and a restart of a processing unit upon setting said one or more of said plurality of bits in said register to indicate if said BIOS should boot to said partition on said subsequent boot.

18. The system as recited in claim 17, wherein said BIOS invokes a series of system checks upon either of said shut down and said restart of said processing unit.

19. The system as recited in claim 18, wherein if said BIOS does not need to boot to said partition then the computer program is further operable to perform the programming steps:
restricting access to said partition; and
completing said series of system checks.

20. The system as recited in claim 15, wherein said partition comprises one or more of the following: an original copy of files of an operating system, code to invoke one or more diagnostic routines, code to update routines, and code to enable remote problem determination and correction.

21. The system as recited in claim 15, wherein said one or more of said plurality of bits indicates that said BIOS should perform one or more of the following activities on said boot to said partition: loading an original copy of files of an operating system, invoking one or more diagnostic routines, updating routines, and enabling remote problem determination and correction.

* * * * *